United States Patent
Vinati et al.

(10) Patent No.: US 11,112,766 B2
(45) Date of Patent: Sep. 7, 2021

(54) METHOD OF ESTIMATING AN ATTITUDE OF A CONTROL DEVICE FOR CONTROLLING OPERATING MACHINES

(71) Applicant: VINATI S.R.L., Nave (IT)

(72) Inventors: Felice Vinati, Nave (IT); Samuele Vinati, Nave (IT); Matteo Vinati, Nave (IT); Mariachiara Vinati, Nave (IT); Giacomo Vinati, Nave (IT); Fabio Previdi, Bergamo (IT); Alberto Cologni, Bergamo (IT); Michele Ermidoro, Bergamo (IT); Luca Bortolotti, Bergamo (IT)

(73) Assignee: VINATI S.R.L., Nave (IT)

( * ) Notice: Subject to any disclaimer, the term of this patent is extended or adjusted under 35 U.S.C. 154(b) by 327 days.

(21) Appl. No.: 15/777,926

(22) PCT Filed: Nov. 18, 2016

(86) PCT No.: PCT/EP2016/078132
§ 371 (c)(1),
(2) Date: May 22, 2018

(87) PCT Pub. No.: WO2017/089236
PCT Pub. Date: Jun. 1, 2017

(65) Prior Publication Data
US 2018/0341245 A1    Nov. 29, 2018

(30) Foreign Application Priority Data

Nov. 24, 2015 (IT) .......................... UB2015A005844

(51) Int. Cl.
*G05B 19/402* (2006.01)
*B66C 13/40* (2006.01)
(Continued)

(52) U.S. Cl.
CPC ............ *G05B 19/402* (2013.01); *B66C 13/40* (2013.01); *G01C 21/08* (2013.01); *G01C 21/165* (2013.01);
(Continued)

(58) Field of Classification Search
CPC ...... B66C 13/40; G01C 21/08; G01C 21/165; G01C 17/38; G01C 19/00; G01C 21/16;
(Continued)

(56) References Cited

U.S. PATENT DOCUMENTS 6,513,252 B1 * 2/2003 Schierbeek ............ G01C 17/38
324/244
6,523,785 B1 * 2/2003 Hennigan .............. B64G 1/244
244/165

(Continued)

FOREIGN PATENT DOCUMENTS

DE    102012021422 A1 *    4/2014

OTHER PUBLICATIONS

P. Daponte, L. De Vito, M. Riccio and C. Sementa, "Experimental comparison of orientation estimation algorithms in motion tracking for rehabilitation," 2014 IEEE International Symposium on Medical Measurements and Applications (MeMeA), Lisboa, Jun. 11-12, 2014, pp. 1-6. (Year: 2014).*

(Continued)

*Primary Examiner* — Jeffrey P Aiello
(74) *Attorney, Agent, or Firm* — Lucas & Mercanti, LLP

(57) ABSTRACT

A method of estimating an attitude of a control device for controlling operating machines, where the control device has a plurality of pushbuttons for controlling the movement of an operating machine along respective directions, the method having the following steps: —preliminary estimating the attitude of the control device using data from an accelerometer and a magnetometer onboard of the control device; —updating of the preliminary estimate of the attitude of the control device using data from a gyroscope onboard of the control device.

12 Claims, 7 Drawing Sheets

(51) Int. Cl.
*G01C 21/08* (2006.01)
*G05B 19/409* (2006.01)
*G01C 21/16* (2006.01)

(52) U.S. Cl.
CPC .. *G05B 19/409* (2013.01); *G05B 2219/36159* (2013.01); *G05B 2219/37422* (2013.01)

(58) Field of Classification Search
CPC ............... G05B 19/402; G05B 19/409; G05B 2219/36159; G05B 2219/37422; G06F 3/0346; G01R 33/0035; G01R 33/028
USPC ............. 33/356; 73/1.01, 1.38, 1.75, 503.3, 73/504.3; 701/4; 702/92–94, 96, 104, 702/141, 145, 150–151, 153
See application file for complete search history.

(56) References Cited

U.S. PATENT DOCUMENTS

| | | | | |
|---|---|---|---|---|
| 2005/0183275 | A1* | 8/2005 | Kwon | G01C 17/30 33/361 |
| 2006/0021238 | A1* | 2/2006 | Sato | G01C 17/38 33/356 |
| 2011/0208473 | A1 | 8/2011 | Bassompiere | |
| 2011/0307213 | A1* | 12/2011 | Zhao | G06F 1/1626 702/153 |
| 2012/0245839 | A1* | 9/2012 | Syed | G01C 21/165 701/408 |
| 2014/0278183 | A1* | 9/2014 | Zheng | G01C 21/165 702/96 |
| 2015/0354980 | A1* | 12/2015 | Wahdan | G01C 25/00 324/202 |
| 2016/0097788 | A1* | 4/2016 | Looze | G01C 22/006 702/141 |

OTHER PUBLICATIONS

Madgwick et al., "Estimation of IMU and MARG orientation using a gradient descent algorithm", IEEE, 2011, XP032318422, pp. 1-7.
Marins et al., "An Extended Kalman Filter for Quaternion-Based Orientation Estimation Using MARG Sensors", IEEE, 2001, vol. 4, pp. 2003-2011.
Daponte, "Experimental Comparison of Orientation Estimation Algorithms in Motion Tracking for Rehabilitation", IEEE, 2014, XF032623219, pp. 1-6.
International Search Report and Written Opinion for International Application No. PCT/EP2016/078132. (15 Pages) (dated Apr. 3, 2017).
Italian Search Report for Corresponding Italian Application No. IT UB20155844. (2 Pages) (dated Aug. 23, 2016).

* cited by examiner

METHOD OF ESTIMATING AN ATTITUDE OF A CONTROL DEVICE FOR CONTROLLING OPERATING MACHINES

CROSS-REFERENCE TO RELATED APPLICATIONS

This application is a 371 of PCT/EP2016/078132, filed Nov. 18, 2016, which claims the benefit of Italian Patent Application No. UB2015A005844, filed Nov. 24, 2015.

FIELD OF THE INVENTION

The present invention concerns a method of estimating an attitude of a control device for controlling operating machines.

BACKGROUND OF THE INVENTION

In the description of the present invention, the term operating machine will refer to any machine having industrial application that is controllable by remote (or by cable), such as earth moving machines, machine tools, lifting equipment such as overhead cranes or the like.

As is known, overhead cranes are machines destined to raise and displace materials and goods, both in the open air and in closed environments, and are generally constituted by a bridge that is horizontally mobile along a pair of tracks and is provided with a crossbar on which a trolley (carriage) is mounted, which trolley can move horizontally along the crossbar. To the trolley a pulley is connected, provided with a hook for gripping and raising objects.

One or more cables are applied on the trolley, which by means of a system including pulleys, shunts and hooks enable weights to be raised or displaced. The movements of the overhead crane can be controlled by an operator equipped with a remote control device.

Known remote control devices allow, using dedicated pushbuttons, to perform all the positional maneuvers of the overhead crane such as "Forward", "Back", "Right", "Left", "Ascent", "Descent", and so on.

These pushbuttons correspond to the signs applied to the overhead crane itself and indicating, with appropriate arrows, the direction of movement of the overhead crane or of the trolley.

By way of explanation: the "Forward" pushbutton, when pressed, corresponds to the advancement of the bridge crane in the direction of the Forward arrow in the cartel or signs applied to the overhead crane; this is also the case for the movement "Back" and for trolley movements "Right" and "Left".

The first difficulty which operators generally encounter is that the control device is movable, being hand-carried by the operator it follows the same operator in his/her movements and, in the case in which the operator is oriented in an opposite way with respect to the direction shown in signs applied to the overhead crane, the "Forward" button will correspond to a movement exactly opposite to the one that the operator would expect, namely "Back".

To better clarify, if the operator looks in the direction indicated by the arrow "Forward", depressing the corresponding pushbutton will make the overhead crane move in the same direction of view of the operator; but if the operator is turned by 180° with respect to the direction indicated by the arrow "Forward", depressing the same pushbutton will cause the movement in the opposite direction with respect to the direction looked at by the operator.

The same can be said of the "Right" and "Left" button that corresponds to the right and left of the operator only in case also the operator is facing in the same direction indicated by signs relating to the crane.

If the operator is turned by 180° with respect to said directions, the "Right" pushbutton would correspond to the left of the operator and vice versa.

All this causes, and may cause security problems when maneuvering with loads that could hit and cause damage to persons or property.

A second example of the problems left open by the known techniques will now be illustrated with reference to problems relating to machine tools.

As is known, in fact, in machine tools for which the X and Y axis can be controlled, i.e. all machine tools that have a knob for the manual approach of the spindle head with indications such as X + and – and Y + and –, the operator must pay great attention to where both the + and – lie because they are fixed, while the control device or other control member in hand the operator is connected with a cable and may turn along with the operator.

Problems similar to those discussed in the case of lifting apparatuses are thus repeated.

A solution to these problems is described in the Italian patent application N° MI2014A001129, to which reference is made, and that is incorporated herein by reference, such application describing a system that makes possible to calculate, by use of an inertial platform comprising a three-axis accelerometer and a gyroscope, the orientation of a control device with respect to an operating machine or to a overhead crane controlled by such device and, where appropriate reallocate the functions "Forward", "Back", "Right", "Left" etc. . . . , as a function of the actual orientation of the control device with respect to the operating machine or to the overhead crane.

In order to improve the calculation of the orientation of the control device, such patent application provides for the use of a magnetic compass suitable to provide a signal representative of the orientation of the control device with respect to the magnetic north, in addition to an inertial platform comprising an accelerometer and a gyroscope.

However, especially in the industrial field where the overhead crane and other lifting machines are used, it is possible that the magnetic measurements are influenced by the presence of metallic masses of significant size or by other factors which may distort those measures. Document D1: DE 10 2012 021 422 discloses a device for controlling lifting apparatuses, such as in particular a crane. The device provides a remote control equipped with means of communication with the actuation elements of the crane and a control element for controlling movement, for example a joystick, operable by an operator and means for determining the rotation angle of the remote control relative to the vertical.

The control unit of the remote control receives signals relating to the orientation of the remote control relative to the vertical from a non-magnetic compass located on the same remote control, for example, a gyro or a gyroscope and calculates appropriate commands to be sent to the organs of movement of the lifting apparatus, in such a way that a movement command issued according to a certain direction corresponds to a movement of the movable members of the lifting apparatus in the same direction or in a direction parallel to it.

An object of the present invention, is to ensure that the pushbuttons of the control device always match the direction of the movement of the load, or of operation in the case of machine tools, that is more natural for the operator, compensating at the same time in real time the possible magnetic disturbances that may occur.

A further aim of the invention is to increase safety in the use of lifting apparatuses.

SUMMARY OF THE INVENTION

Such objectives are attained by a method of estimating an attitude of a control device for controlling operating machines, where the control device comprises a plurality of pushbuttons for controlling the movement of an operating machine along respective directions, the method comprising the following steps:

preliminary estimating the attitude of the control device using data from an accelerometer and a magnetometer onboard of the control device;

updating of the preliminary estimate of the attitude of the control device using data from a gyroscope onboard of the control device.

Among the advantages of the described solution it can be considered the fact that it makes the pushbuttons reassigning function robust with respect to possible magnetic disturbances that may distort orientation estimate.

In particular, the two steps of preliminary estimating the attitude of the control device and of updating such estimate are strictly intercorrelated with each other because the preliminary estimate obtained by data from the accelerometer and the magnetometer is then filtered using the gyroscope measurements for compensating possible magnetic disturbances that may affect the magnetometer.

Further characteristics of the invention can be found in the dependent claims.

BRIEF DESCRIPTION OF THE DRAWINGS

Further characteristics and advantages of the invention will emerge from a reading of the following description, provided by way of non-limiting example, with the aid of the figures illustrated in the accompanying figures of the drawings, in which.

DETAILED DESCRIPTION OF EXEMPLARY EMBODIMENTS

Figure 1:
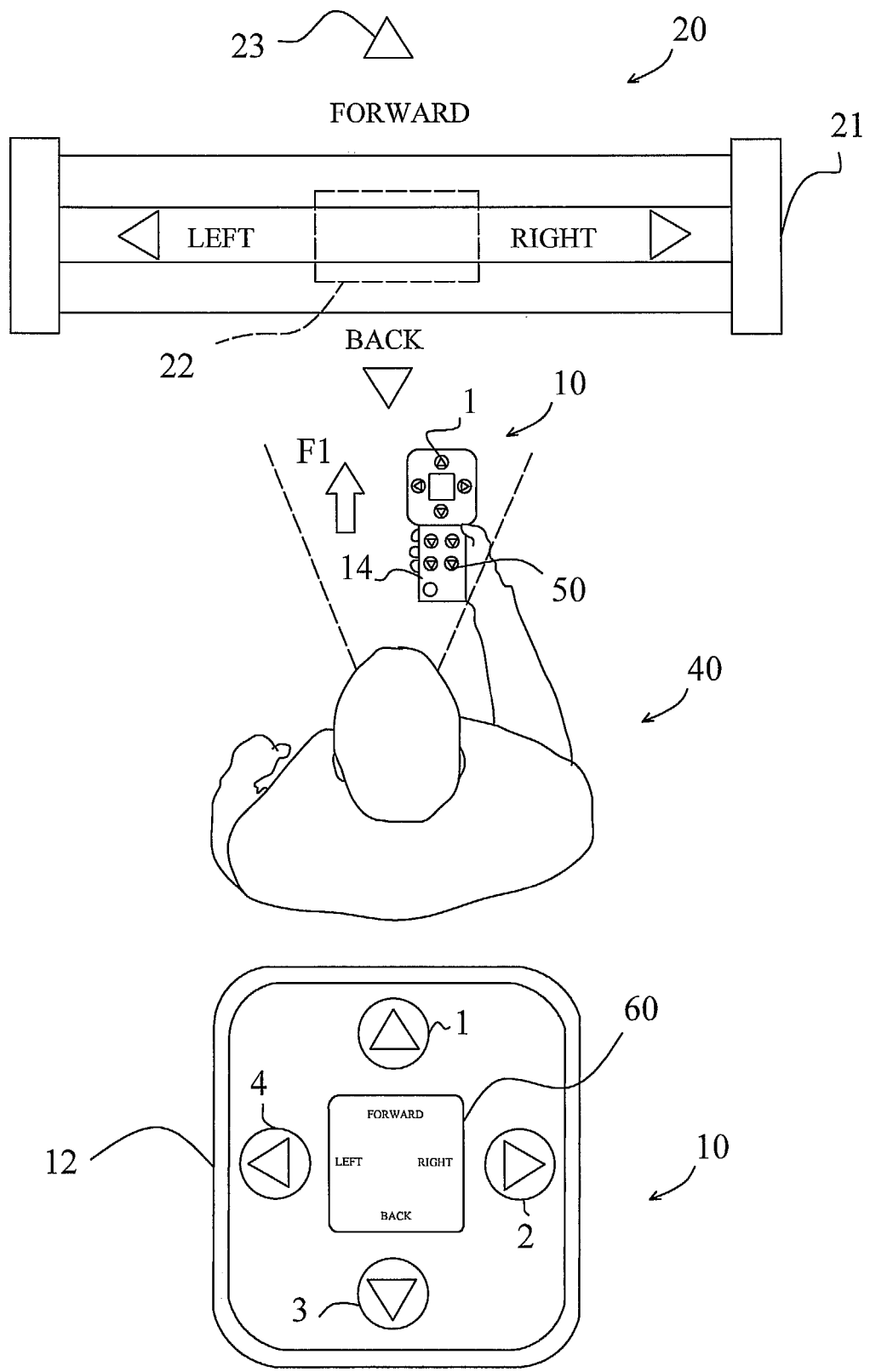
FIG. 1 is a schematic representation of an operator equipped with a control device to operate an overhead crane.
Figure 2:
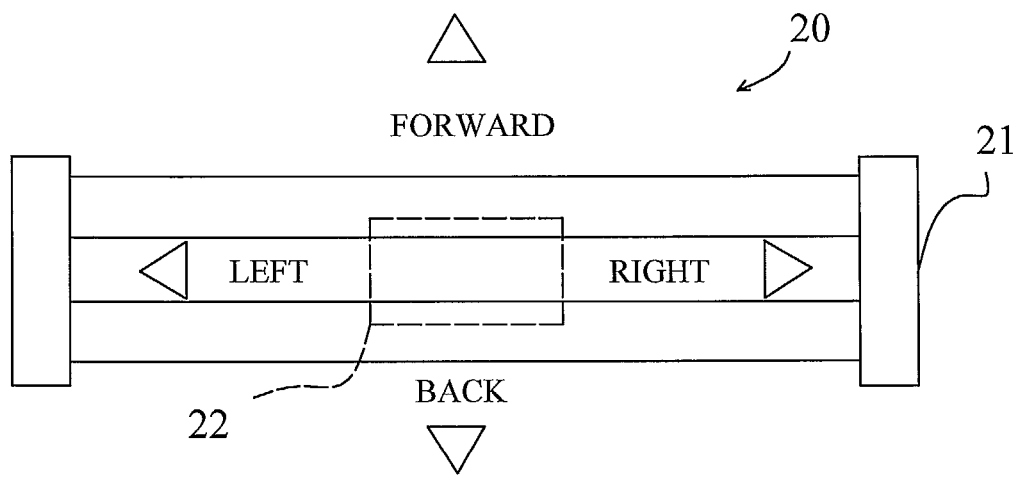
FIGS. 2-4 are further representation of an operator having different orientations with respect to the overhead crane of FIG. 1.
Figure 2:
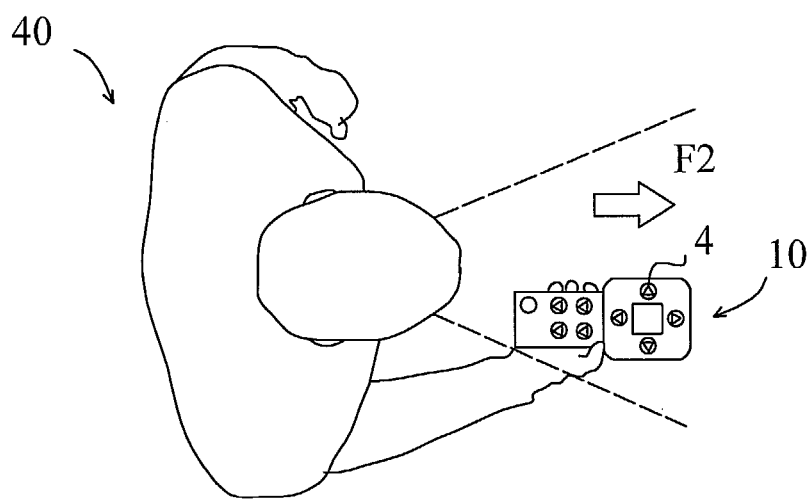
Figure 2:
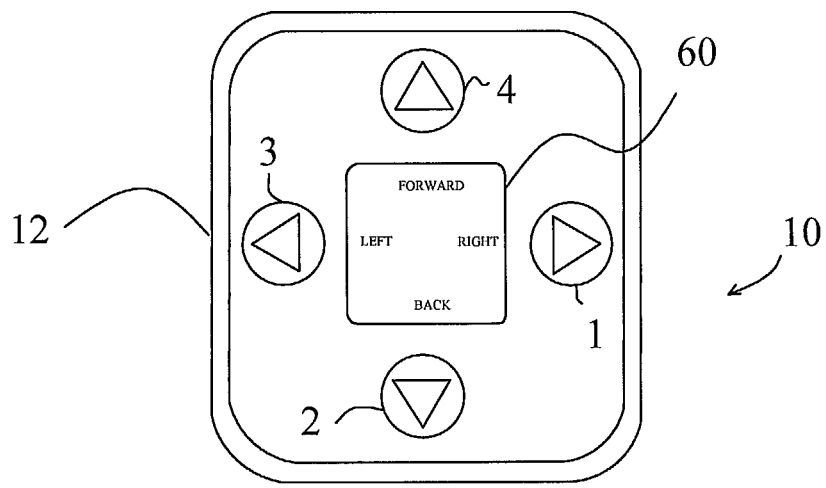
Figure 3:
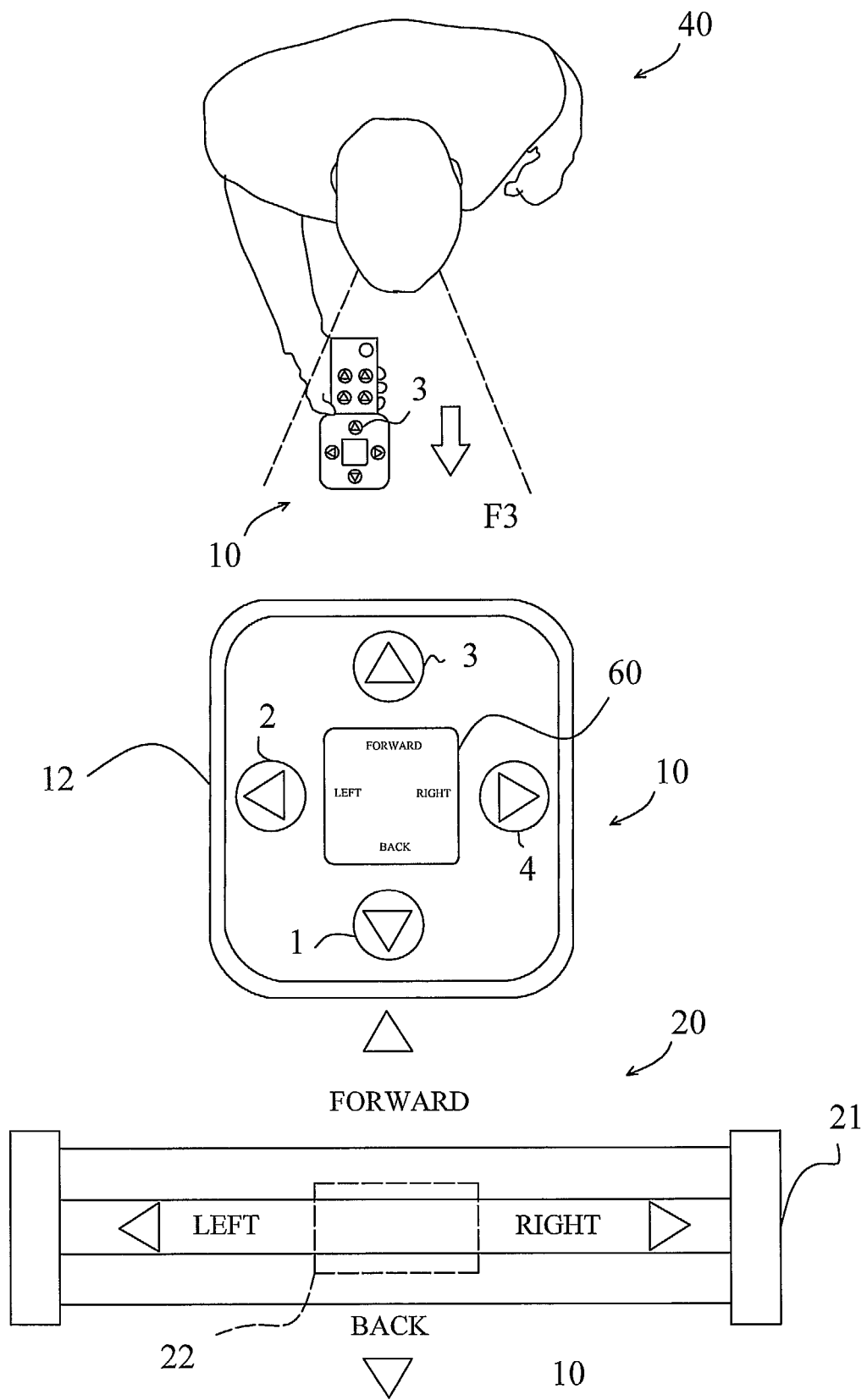
Figure 4:
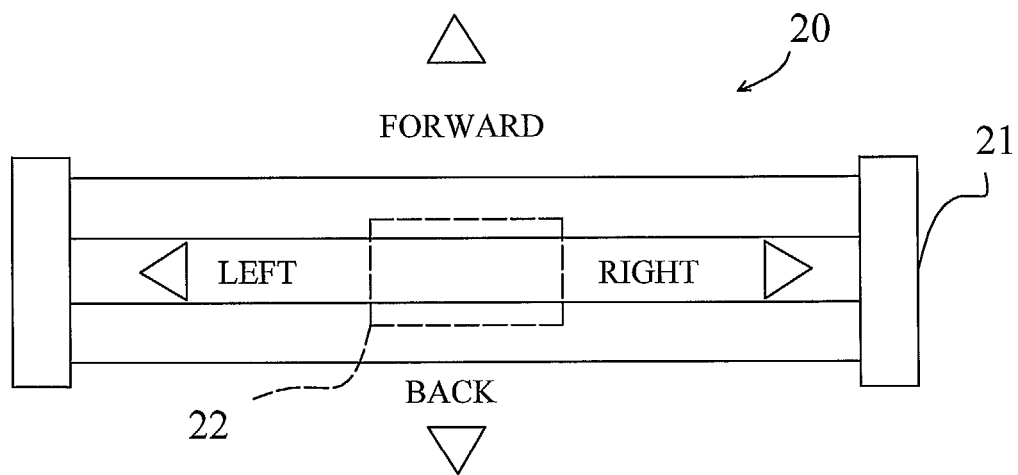
Figure 4:
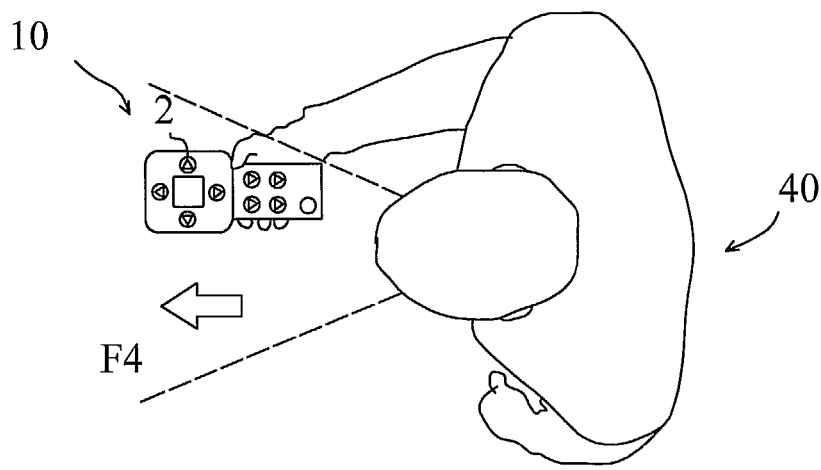
Figure 4:
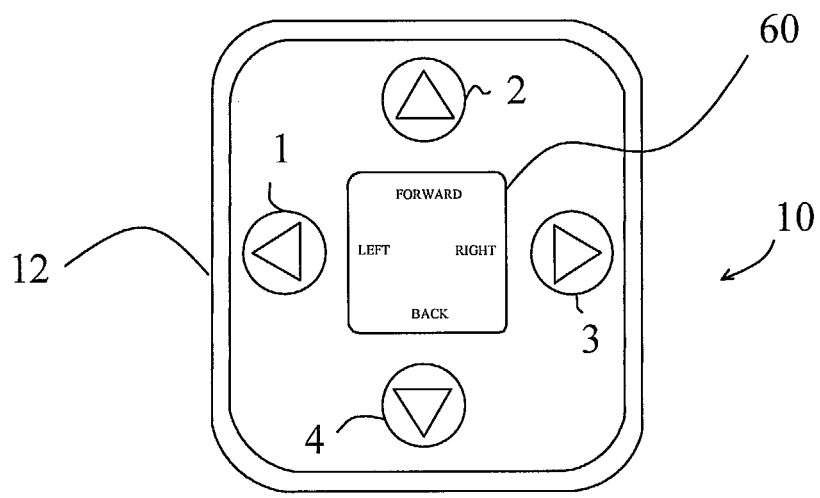

In FIGS. 1-7 a control device 10 which operates on a lifting apparatus, in particular an overhead crane 20, is represented.

The overhead crane 20 is provided with a bridge 21 movable along a first horizontal direction and a trolley 22 movable along a second horizontal direction perpendicular to the first and that carries a raised load, as well as by way of example a sign 23 associated with the overhead crane 20, the sign being made of a set of instructions readable by the operator illustrating, in particular, four operating directions, namely "Forward", "Back", "Right", "Left". For example, the indications "Forward" and "Back" may indicate the possible movements of the overhead crane as a whole, while the indications "Right" and "Left" may indicate the possible movements of one part of the overhead crane 20, in particular of the trolley 22.

Still in FIG. 1 it is visible an operator 40 which uses the control device 10 according to one embodiment of the present invention and it is also visible an enlargement of a quadrant 12 of the control device 10, the quadrant showing buttons 1, 2, 3 and 4 for the actuation of the overhead crane 20 according to four operating directions.

The control device 10 may also include a display 60 used to inform the operator 40 on the functions of the various buttons including the direction pushbuttons 1-4, or to represent other information such as alarm or malfunction signals, or other.

Figure 7:
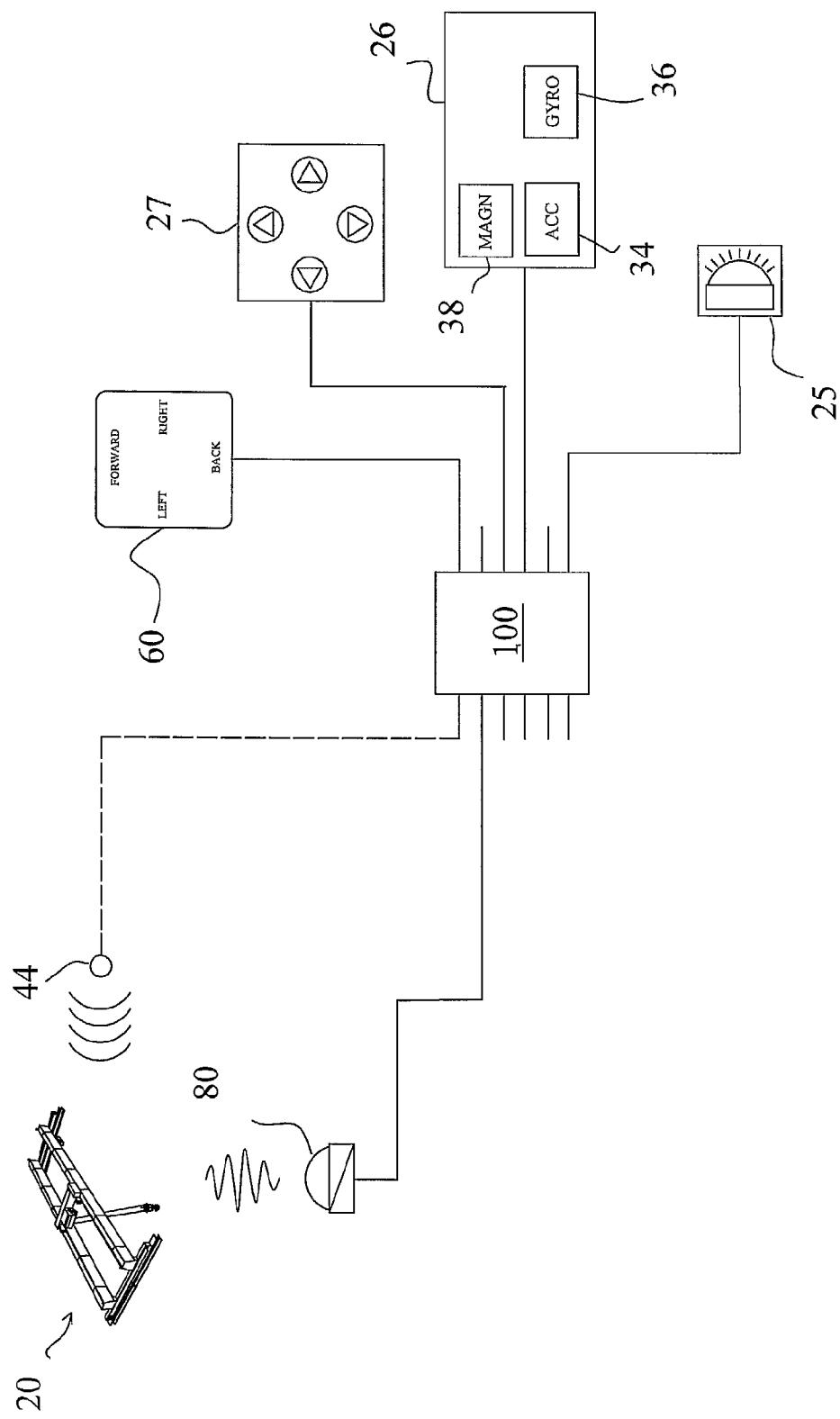
FIG. 7 shows the major components of a control device according to an embodiment of the present invention.

With reference to FIG. 7 the main components of the circuitry of the control device 10, according to one embodiment of the present invention are described.

In particular, internally to the casing 14, the control device includes a control unit 100 connected to an inertial platform 26, where the control unit 100 controls a functions reallocation module 27 for the pushbuttons 1, 2, 3 and 4 of the control device 10.

In particular, the inertial platform 26 that includes a three-axis accelerometer 34 and a triaxial gyroscope 36, where both of the above components can be managed by the control unit 100, equipped with a microprocessor.

The inertial platform 26 is placed inside its casing 14 of the control device 10, and is therefore fixed to the same control device and records its movements. With reference now to inertial platform 26, it is observed that the three-axis accelerometer 34 is able to measure the roll angle (namely the angle of rotation of the control device with respect to the X axis in FIG. 6) and the pitch angle (namely the angle of rotation of the control device relative to the axis Y of the device in FIG. 6) of the control device 10.

However, the measurements of the three-axes accelerometer indicate only the inclination of the control device 10 in space, but do not contain the information concerning the direction towards which the control device 10 is oriented, because a rotation of the control device 10 around the vertical axis Z (FIG. 6) does not cause variations in the angle that the axes X and Y form with respect to the horizontal plane.

In order to complete the representation in space of the movements of the control device 10, the inertial platform 30 also includes a gyroscope 36.

As it is known, the gyroscope 36 is an instrument that has the tendency to maintain its axis of rotation oriented in a fixed direction and thus allows to measure an angular velocity with respect to such fixed direction.

In the specific case the triaxial gyroscope 36 has its three axes integral with the three axes of the accelerometer 34.

Therefore, the combination of the information derived from measurements made by the accelerometer 34 and by the gyroscope 36 can be used to determine the orientation of the space completely control.

Finally, the inertial platform 26 also includes a three-axis magnetometer 38.

As it is known, a magnetometer is an instrument that measures the magnetic field component along a particular direction of space.

By virtue if the three-axial magnetometer 38 it is possible to proceed to the measurement of the components of the field along three independent directions, so as to univocally define the magnetic field vector at the point where the measurement is made.

In summary, in order to estimate the orientation of the control device with respect to a fixed reference consisting of three mutually orthogonal Cartesian axes, the control device described includes three types of instruments:

Three-axial accelerometer: measures the accelerations experienced by the control device on the three axes;

Three-axial magnetometer: measures the magnetic field components on three axes;

Three-axial gyroscope: measures the angular speed of rotation of the control device around the three axes.

The control unit 100 is also able to display messages on the display 60 of the control device 10, for example, messages that match the direction assigned to the pushbuttons to the corresponding message that appears on signs of the bridge crane, or warning or alarm messages.

The control unit 100 is in fact also able to activate a visual and/or acoustic alarm 25 in case of need, as will be better explained in the following.

In the described embodiment, the control unit 100, together with the inertial platform 26, is contained within the control device 10.

In addition, the control device 10 can be operated remotely or be connected by cable to the machine.

In a first phase of the use of the control device 10 it is necessary to proceed to a phase of setting of the same that can take place, for example, according to the following mode (FIG. 1).

The pushbutton 1 is associated with the "Forward" function that corresponds to the indication with the "Forward" arrow printed on signs and the area included between 315° and 45° considering the 360° value as directed upwards in FIG. 1.

The pushbutton 2 is associated with the "Right" function that corresponds, with reference to the orientation of FIG. 1, to the sector included between 45° and 135°.

The pushbutton 3 is associated with the "Back" function which corresponds, with reference to the orientation of FIG. 1, to the sector included between 135° and 225°.

The pushbutton 4 is associated with the "Left" function that corresponds, with reference to the orientation of FIG. 1, to the sector included between 225° and 315°.

By making use of the combination of the directions detectable by the inertial platform 26 and by the magnetometer 38, it is possible to create a control device that modifies the functions of the pushbuttons of the lifting apparatus, as a function of the orientation of the control device 10.

In fact, the pushbuttons associated with the movements "Forward" "Back" "Right" "Left" become pushbuttons that determine movement functions that are variable as a function of the orientation in space of the control device.

In case the control device is rotated, the pushbuttons 1, 2, 3 and 4 will assume and activate a movement of the lifting apparatus that is coherent with the direction indicated by the pushbuttons at that precise moment.

This movement function will remain active as long as the relative pushbutton remains pressed.

Therefore, once the setup under which the pushbutton 1 is associated with the displacement function "Forward" is performed, as the orientation of the control device 10 varies as detected by the inertial platform, the same pushbutton will assume the different function assigned to the sector.

Upon rotation of the control device the directional pushbuttons will always correspond to the direction assumed by the operator.

The same will then occur when pressing the pushbutton whose arrow indicates the direction to the right, the overhead crane 20 or the trolley will perform a displacement to the right of the operator.

In fact, the movement of the load will always correspond to the direction indicated by the arrow pushbuttons, however the control device and/or the operator is oriented.

In practice, whatever the orientation of the control device with respect to the overhead crane 20 is, the movements performed by the overhead crane itself and by the trolley will always correspond to the indication of the arrow on the control device 10 while corresponding to the poster signs applied to the overhead crane.

Once the setting has been performed, until the operator 40 keeps the control device 10 oriented substantially according to the direction F1 in FIG. 1, the pushbuttons assigned by the pushbuttons reassignment module 27, will continue to function in the same way.

In case instead the operator rotates by 90° degrees to the right together with the control device 10 itself or rotates only the control device 10 by 90° degrees to the right (direction F2 in FIG. 2):

to the pushbutton 4, the pushbuttons reassignment module 27 will assign the function of the pushbutton 1 namely "Forward";

to the pushbutton 3, the pushbuttons reassignment module 27 will assign the function of the pushbutton 4 namely "Left";

to the pushbutton 2, the pushbuttons reassignment module 27 will assign the function of the pushbutton 3 namely "Back"; and to the pushbutton 1, the pushbuttons reassignment module 27 will assign the function of the pushbutton 2 namely "Right".

This reassignment of functions can take place automatically because, following the rotation in the horizontal plane of the control device 10, the algorithm described below computes the new direction value and communicates it to the control unit 100 which then provides the appropriate commands to the pushbuttons reassignment module 27.

In case instead the operator rotates by 180° degrees with respect to the initial direction together with the control device 10 itself or rotates only the control device 10 by 180° degrees with respect to the initial direction (direction F3 in FIG. 3):

to the pushbutton 3, the pushbuttons reassignment module 27 will assign the function "Forward";

to the pushbutton 4, the pushbuttons reassignment module 27 will assign the function "Right";

to the pushbutton 1, the pushbuttons reassignment module 27 will assign the function "Back"; and to the pushbutton 2, the pushbuttons reassignment module 27 will assign the function "Left".

Finally, in case the operator rotates by 270° degrees with respect to the initial direction (or toward his left of 90°) together with the control device 10 itself or rotates only the control device 10 by 270°) degrees with respect to the initial direction (direction F4 in FIG. 4):

to the pushbutton 4, the pushbuttons reassignment module 27 will assign the function "Back";
to the pushbutton 1, the pushbuttons reassignment module 27 will assign the function "Left".
to the pushbutton 2, the pushbuttons reassignment module 27 will assign the function "Forward"; and
to the pushbutton 3, the pushbuttons reassignment module 27 will assign the function "Right".

As it can be guessed the control device 10 always performs the movements corresponding to the direction indicated by the pushbutton or by the arrow pushbutton with respect to the direction assumed by the control device 10 itself with respect to the overhead crane 20.

The pushbuttons, whatever the orientation of the control device with respect to the bridge crane 20 is, will always correspond to what is indicated in the posters.

The pushbutton 1 will assume the default function "Next" corresponding to the signs.

Upon rotation of 90° of the control device or within an orientation internal to the sector of activity +45° or −45° with respect to the 90° axis the pushbutton 1 will assume the function "Left" corresponding to the posters.

A further variation of 180° of the control device or within an orientation internal to the sector of activity +45° or −45° with respect to the 180° axis the pushbutton 1 will assume the function "Back" corresponding to the posters.

A further variation of 270° of the control device or within an orientation internal to the sector of activity +45° or −45° with respect to the 270° axis the pushbutton 1 will assume the function "Right" corresponding to the posters.

Upon rotation of 360° the pushbutton 1 will assume the default function "Forward".

The activity sectors have been defined in terms of +45° or −45° with respect to a central axis, but this was done only by way of non limiting example, since the requirements to determine the reallocation of the directions of movement imparted by all the pushbuttons to the lifting apparatus or to a component on the basis of information provided by the inertial platform relative to the orientation in space of the control device are software configurable.

The control device can be equipped with a display showing the new functions assumed by the pushbuttons or the by arrow pushbuttons.

In case of failure or system error the display will show the default forward function and the relative pushbutton or arrow pushbutton will assume the default function corresponding to the posters.

This greatly simplifies the modus operandi of the operator 40, even if not an expert, in order to avoid that operating errors can cause damage to persons or property.

The orientation of the pushbuttons will always and in any case indicate the direction that the load is desired to assume.

The control unit 100 of the control device 10 may also have means for determining its own distance with respect to a reference position on the lifting apparatus, for example by means of an ultrasonic telemeter 80, namely a telemeter which uses the time taken by a packet of acoustic pulses at high frequency emitted by the telemeter itself to achieve a target placed on the overhead crane and return to the telemeter. Other distance meters 44 known in the art may be used alternatively.

Another device included in the control device 10 is an alarm button 50 which, when activated, can trigger an alert by means of the computer installed on the machine and connected via Wi-Fi to the control device.

If the computer receives the signal it will activate appropriate sound and/or visual alarms 25, and will submit help request via SMS or via the Web pointing to its location.

Figures 6, 8:
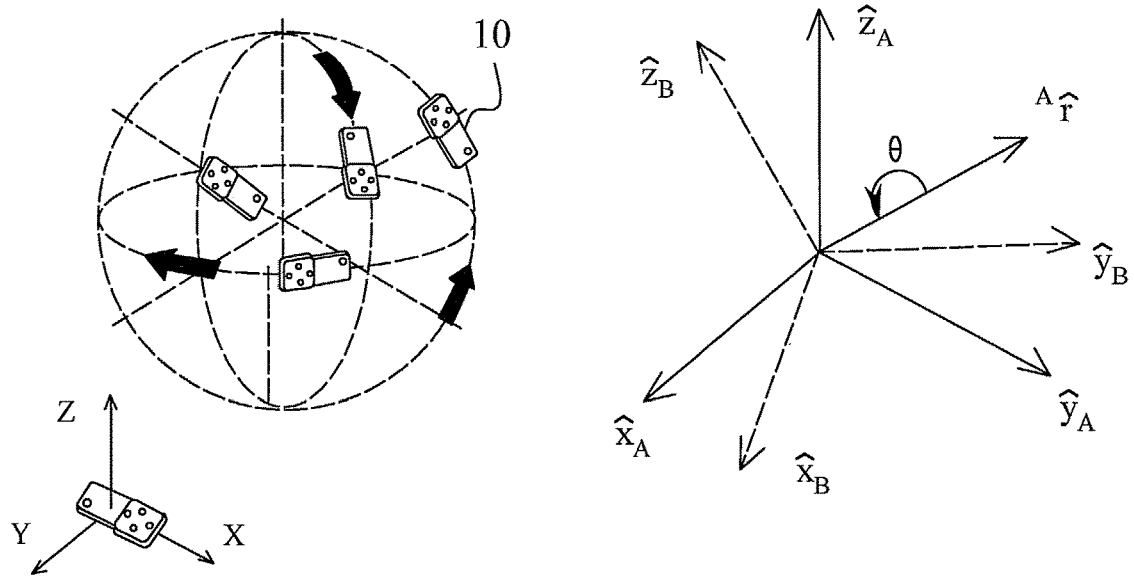
FIG. 6 conceptually represents the fact that the control device can be operated in any direction of the space.
FIG. 8 represents a rotation of a reference system B with respect to a reference system A of an angle θ with respect of a unitary vector $^A\hat{r}$, defined in the reference system A.

Since the control device 10 operates in the space X, Y, Z (as schematically represented in FIG. 6), by virtue of the inertial platform 26, the control unit 100 is always informed of the orientation of the control device 10, in particular when it is not perfectly horizontal, and in such a case it will operate the appropriate corrections. So whatever its orientation in space is, the control device 10 is able to operate as if it were on the two axes X and Y that define the horizontal plane.

In case of a malfunction of the control device 10, the control unit 100 is able to control the display 60 of the control device 10 to display a warning message, for example: "Control device inoperative" or "Control device operating only in the conventional way", this last message being able to be displayed when the control system of the pushbutton functions using the inertial platform has been disabled.

In a variant of the invention, in case of malfunction of the control device, it can be attached via cable to the lifting apparatus or operating machine, thus continuing to operate as a cable control device.

In another embodiment of the invention, in place of a control device 10 as described above, it is possible to employ a single pushbutton operable according to different directions, being the inventive concepts described above applicable also in this case, in particular said single pushbutton being able to perform the functions of "Forward", "Back", "Right" and "Left".

In a further embodiment of the invention, in place of a control device 10 as described above, it is possible to employ a joystick or other similar device, where the command member of such device comprises a stick that can be acted upon several directions, for example "Forward", "Back", "Right" and "Left".

The developed algorithm is able to estimate the orientation of the control device and consequently change the function of the pushbuttons.

According to the present invention, the system also provides a methodology to make the system robust to possible magnetic disturbances, caused for example by metallic masses of significant size in the vicinity of the control device 10 or by other factors and that may distort the orientation estimation, in particular by affecting the measurements of the magnetometer 38.

The algorithm can be divided into two phases:
1. Attitude estimation that is robust towards magnetic disturbances
2. Calculation of the heading angle, namely of the orientation of the control device.

Figure 9:
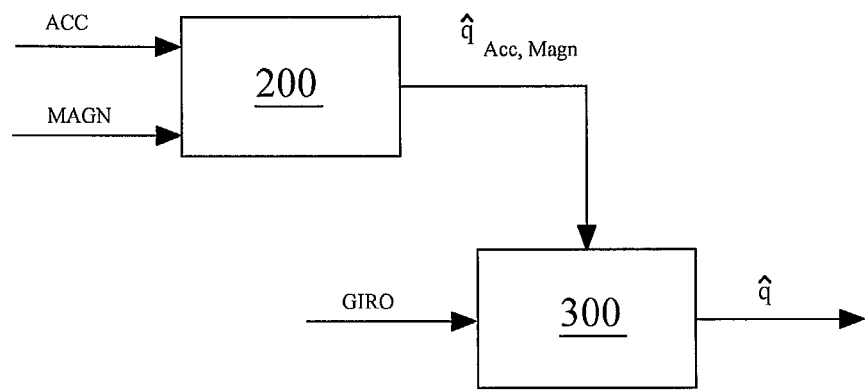
FIG. 9 represents a flowchart of the method steps according to the present invention.

More in detail, with reference to FIG. 9, the method comprises the following steps:
preliminary estimation of the attitude of the control device using data from the accelerometer 34 and from the magnetometer 38 (block 200);
updating of the preliminary estimate of the attitude of the control device using data from the gyroscope (block 300).

In order to represent mathematically in a compact way the rotations of the control device, the method described herein provides to represent orientations and rotations of the control device by using quaternions, namely hypercomplex numbers each having three imaginary component and a real component that allow to represent three-dimensional orientations of an object without singularity problems, such as the phenomenon known as "gimbal lock" that can occur with the use of so-called Euler angles known as Roll, Pitch and Yaw.

Quaternions have also the advantage of using only four parameters.

As is known, a quatemion is a hypercomplex number defined in the following way:

$$q = q_0 + iq_2 + jq_2 + kq_3$$

The quatenion q therefore has a real part, namely $q_0$, and a vector part $q = iq_1 + jq_2 + kq_3$, such part can be considered as composed by the components of an ordinary vector in three-dimensional space.

The main property of the quaternions is given by the following relationships:

$$i^2 = j^2 = k^2 = ijk = -1$$

These relationships are shown in detail in the following multiplicative table:

TABLE 1

| X | 1 | i  | j  | k  |
|---|---|----|----|----|
| 1 | 1 | i  | j  | k  |
| i | i | −1 | k  | −j |
| j | j | −k | −1 | i  |
| k | k | j  | −i | −1 |

In addition, the complex conjugate q* of a quaternion can be defined as:

$$q^* = q_0 - iq_1 - jq_2 - kq_3$$

where the complex conjugate q* has the directions of its own vector part that are opposed with respect to the original quaternion q.

The product of a quaternion q for its complex conjugate q* gives rise to a real number that is calculable with the following formula:

$$qq^* = q_0^2 + q_1^2 + q_2^2 + q_3^2$$

Quaternions are used to represent, in a compact way, arbitrary orientations of a reference system B with respect to a reference system A, for example rotations of an angle θ with respect to a unit vector $^A\hat{r}$ defined in the reference system A, as illustrated for example in FIG. 8

The quaternion describing such orientation may be indicated as $_B^A\hat{q}$ and is defined by the following equation:

$$_B^A\hat{q} = [q_0, q_1, q_2, q_3] = \left[\cos\frac{\theta}{2}, -r_x sen\frac{\theta}{2}, -r_y sen\frac{\theta}{2}, -r_z \cos\frac{\theta}{2}\right]$$

where rx, ry and rz define the unit vector components $^A\hat{r}$ with respect to the axes X, Y and Z of reference system A.

Finally, the multiplication of two quaternions is generally indicated with the symbol ⊗ and can be used to define the composition of two or more orientations.

For example, considering two orientations $_B^A\hat{q}$ and $_C^B\hat{q}$, the compound orientation, indicated with $_C^A\hat{q}$ can be defined as:

$$_C^A\hat{q} = {_B^A\hat{q}} \otimes {_C^B\hat{q}}$$

In terms of components, the product of two quaternions a and b can be calculated with the Hamilton rule:

$$a \otimes b = [a_0, a_1, a_2, a_3] \otimes [b_0, b_1, b_2, b_3] = \begin{bmatrix} a_1b_1 - & a_2b_2 - & a_3b_3 & -a_4b_4 \\ a_1b_2 + & a_2b_1 + & a_3b_4 & -a_4b_3 \\ a_1b_3 - & a_2b_4 + & a_3b_1 & +a_4b_2 \\ a_1b_4 + & a_2b_3 - & a_3b_2 & +a_4b_1 \end{bmatrix}^T$$

The product of two quaternions is not commutative, namely in general a⊗b≠b⊗a.

This reflects the fact that the composition of two orientations can give, in general, a resulting orientation that is different depending on the order in which the orientations are performed.

A three-dimensional vector can be rotated by means of a quaternion using the following relationship:

$$B_v = {_B^A\hat{q}} \otimes A_v \otimes {_B^A\overline{q^*}}$$

where $A_v$ and $B_v$ represent the same vector respectively in the reference system A and in the reference system B.

In order to proceed with the preliminary estimation of the orientation of the control device, starting from the measures obtained from the accelerometer 34 and the magnetometer 38, it is necessary to obtain the quatemion that allows to align the magnetic and accelerometer measurements with their respective gravitational and magnetic fields.

To do this a minimization algorithm is used, in particular a gradient descent algorithm, where this expression it is intended an algorithm that makes use of a function to be minimized by taking the gradient, starting from a given starting point, towards the desired minimum point, iterating by negative steps that are proportional to the gradient calculated at the current point.

The function to be minimized is the following:

$$\min(f(\hat{q}, {^E\hat{d}}, {^B\hat{s}})) = \min(\hat{q} \otimes {^E\hat{d}} \otimes \hat{q} - {^B\hat{s}})$$

where $^E\hat{d}$ is a fixed three-axis reference integral with the earth reference system and $\hat{q}^* \otimes {^E\hat{d}} \otimes \hat{q}$ is the reference vector in the three-axis reference of the sensors.

In particular, for the accelerometer 34 the function to be minimized can be expressed as $\min(f(\hat{q}, {^E\hat{d}}, {^B\hat{s}}))$, where the term $^B\hat{s}$ is the vector composed by the measurements of the accelerometric sensor.

Similarly, for the magnetometer 38 the function to be minimized can be expressed as $\min(f(\hat{q}, {^E\hat{b}}, {^B\hat{m}}))$ where $^E\hat{b}$ is a fixed three-axis reference integral with the magnetic field of the earth and where the term $^B\hat{m}$ is the vector composed of the magnetometer 38 measures.

Therefore, in order to find the quaternion that expresses the orientation of the control device obtained starting only from the measurements of the magnetometer 38 and of the accelerometer 34, it is necessary to combine together the functions to be minimized and proceed with the estimation of the quaternion using both sensors, for example by means of a gradient descent algorithm. In this case, the reference vector will be composed of 6 values, as well as the vector of sensor measurements.

The result is a single quaternion $\hat{q}_{Acc,Mag}$ that best represents such rotation with such data.

The second part of the method according to an embodiment of the present invention, provides for the updating of the preliminary estimate of the quaternion representing the orientation of the control device by use of data from the gyroscope.

A preferred embodiment provides merging the information from the gyroscope with those coming from the preliminary estimate of the orientation obtained by the measurements of the accelerometer 34 and of the magnetometer 38, by using an Extended Kalman Filter.

As is known, a Kalman filter is a recursive algorithm that allows the estimation of the state that characterizes a dynamic system, starting from observations of the state itself that are not completely reliable because affected by noise.

In this case, the model used to define the Kalman filter is the following:

$$x_k = f(x_{k-1}, \omega_k) + V_{1,k}$$

$$z_k = H x_k + V_{2,k}$$

where X is a state vector made by the four components of the quaternion $q = [q_0\ q_1\ q_2\ q_3]$ representing the orientation obtained starting only from the measurements of the magnetometer 38 and of the accelerometer 34, H is a 4×4 identity matrix 4×4, $V_{1,k}$ represents the process noise which is assumed to be drawn from a normal distribution with variance expressed by a matrix Q, $V_{2,k}$ represents the measurement noise which is assumed to be drawn from a normal distribution with variance expressed by a matrix R.

The transition function $f(x_{k-1}, \omega_k)$ is based on the following equation that connects the gyroscopic measurements ω to the derivative of the quaternion:

$$\dot{q} = 0.5 * q \otimes \omega$$

In order to make the estimate robust also in case of magnetic noise, a solution based on the evaluation of the module of the magnetic field has been studied.

The Earth's magnetic field has an almost constant modulus of about 45 nT. When a magnetic noise increases or decreases (curve M of FIG. 10), to the magnetometric measurements corrective measures are applied.

Figure 10:
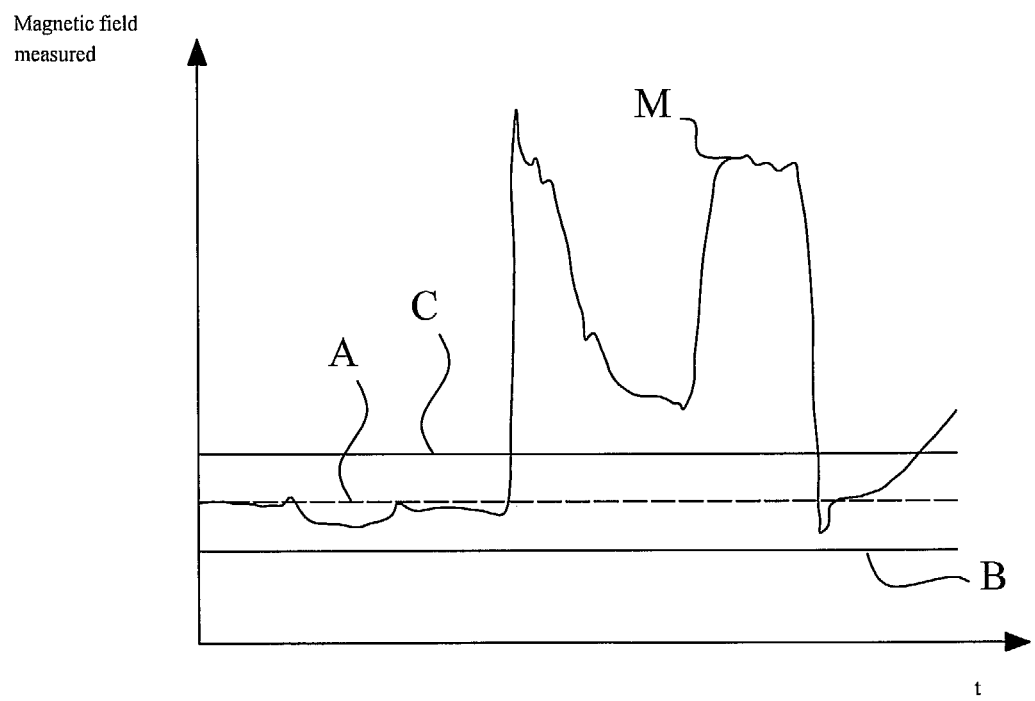
FIG. 10 represents the time evolution of a magnetic disturbance influencing the measurement of a magnetometer.

As can be seen in FIG. 10, two areas of operation can be defined:

within a safety area around the value defined by curve A, defined by the threshold values B and C, the Q and R matrices are linearly varied, in order to give more confidence to the estimation from the magnetometer;

outside of the area defined by the thresholds B and C, the magnetic disturbance is considered too strong and magnetometric measures are no longer used in the phase of preliminary estimate. In the Kalman filter instead those Q and R matrices that give less confidence to the preliminary estimate are used.

These measures allow that a magnetic disturbance does not affect the estimation of the attitude of the control device.

In this way, a quaternion $\hat{q} = [q_0, q_1, q_2, q_3]$ that expresses the attitude of the control device is estimated.

The heading angle, namely the angle formed by the chosen reference system and the direction towards which the control device points, can be calculated by employing the components of the quaternion estimated previously by using the following equation:

$$\varphi = \tan^{-1} \frac{2(q_0 q_3 + q_1 q_2)}{1 - 2(q_0^2 + q_3^2)}$$

wherein q0, q1, q2 are q3 the components of the quaternion $q = [q_0, q_1, q_2, q_3]$ estimated by means of the Kalman filter.

On the basis of the heading angle four quadrants are defined each of 90° that allow to identify the direction towards which the control device is pointing and, consequently, if necessary, allow to change the direction associated with each pushbutton according to the modes described above.

Figure 5:
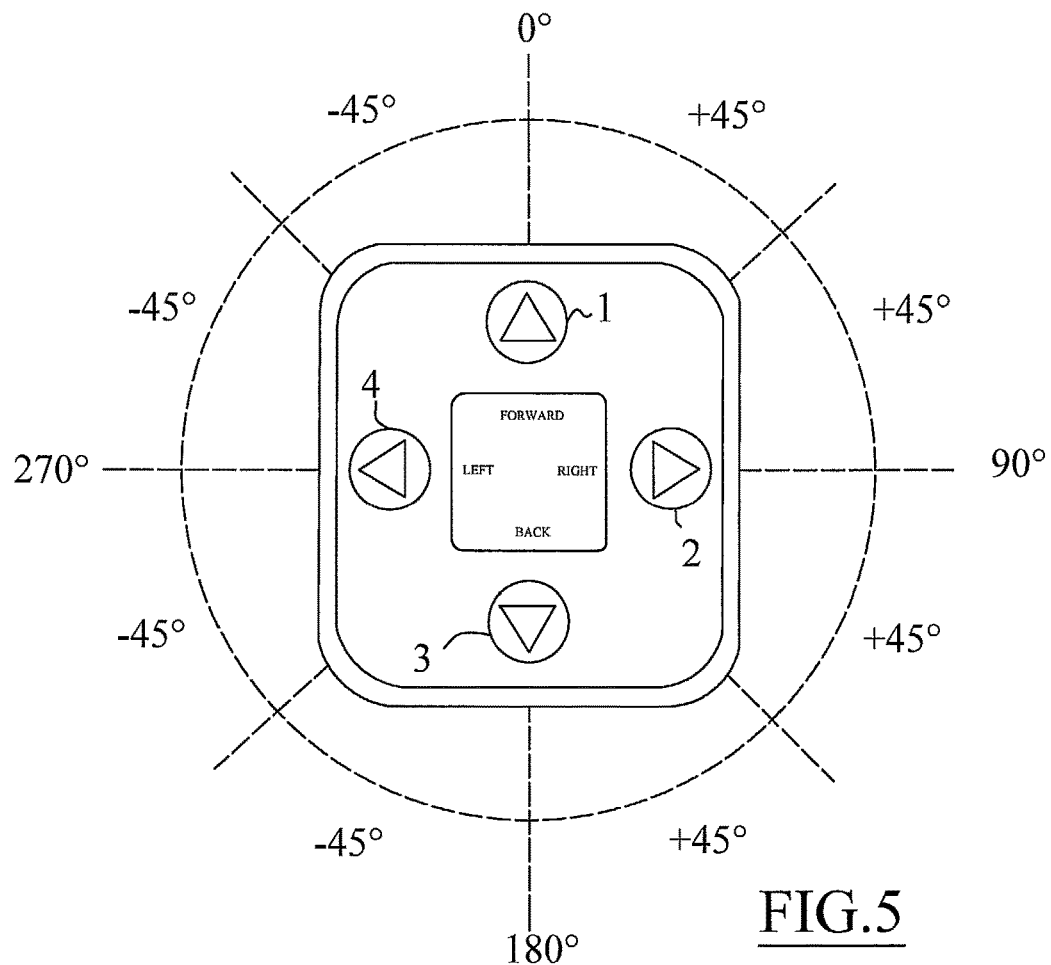
FIG. 5 represents the area of operation of a control device for an overhead crane or for a working machine, according to one embodiment of the present invention.

Once the heading angle is obtained, tolerance zones are preferably defined around the boundaries of the quadrants shown in FIG. 5 and placed, with respect to the heading angle, at 45°, 135°, 225° and 315°.

When the heading angle of the control device is located within the tolerance zones, preferably the previous configuration is maintained until the control zone rotates, exiting form the tolerance zone into the adjacent quadrant.

To ensure greater safety during use, it is also possible to add different light, sound or vibration signals, according to the situation of the inertial control device, as for example, a signal that warns of the change of configuration of the pushbuttons and change and a signal that warns when the control device is oriented above one of the 4 borders which determine the change of the quadrant.

The control devices described above can be applied, in addition to lifting apparatuses, to any other operating machine, construction equipment, machine tools or the like.

Obviously modifications or improvements can be made to the invention as described herein above, dictated by contingent or special motives, without the invention's forsaking the ambit of protection as claimed herein below.

The invention claimed is:

1. A method of controlling an operating machine according to different directions of movement using a control device, the method comprising the steps of:
    estimating an attitude of the control device, the control device comprising a plurality of pushbuttons for controlling a movement of the operating machine along at least four directions and a quadrant indicating the at least four directions, the method comprising the following steps:
        defining a safety range around an Earth's magnetic field value (A), the safety range being defined between a low threshold value (B) of the magnetic field and a high threshold value (C) of the magnetic field;
        preliminarily estimating an attitude of the control device using data from an accelerometer and data from a magnetometer onboard of the control device;
        updating a preliminary estimate of the attitude of the control device using data from a gyroscope onboard of the control device; and
        no longer using the data from the magnetometer, if the data are not within the safety range;
    determining a heading angle of the control device as a function of the estimated attitude; and
    reassigning the control functions of the pushbuttons of the control device as a function of the determined heading angle of the control device in such a way that the reassigned control functions of the pushbuttons correspond to the at least four directions indicated on the quadrant.

2. The method according to claim 1, wherein the step of preliminarily estimating the attitude of the control device is carried out by estimating a quaternion $\hat{q}_{Acc,Mag}$ representing said attitude, wherein the quaternion $\hat{q}_{Acc,Mag}$ is estimated by minimizing a function correlating the quaternion $\hat{q}_{Acc,Mag}$ to a reference vector and to a vector of measurement obtained from the accelerometer and the magnetometer.

3. The method according to claim 2, wherein the minimizing is performed applying a gradient descent algorithm.

4. The method according to claim 2, wherein the updating of the preliminary estimate of the attitude of the control device using data from the gyroscope is performed by an extended Kalman filter that allows an estimate of a quaternion $\hat{q}=[q_0,q_1,q_2,q_3]$ describing the attitude of the control device to be made.

5. The method according to claim 4, wherein the extended Kalman filter is given by the following equations:

$$x_k = f(x_{k-1}, \omega_k) + V_{1,k}$$

$$z_k = Hx_k + V_{2,k}$$

wherein vector x is composed by the components of the quaternion $\hat{q}=[q_0,q_1,q_2,q_3]$ describing the attitude of the control device, parameter $\omega_k$ consists in the data from the gyroscope, H is a 4×4 identity matrix, $V_{1,k}$ and $V_{2,k}$ represent respectively process noise and measurement noise the variances of which are respectively defined by matrixes Q of process variance and R of measurement variance of the Kalman filter and the transition function $f(x_{k-1}, \omega_k)$ is based on the following equation $\dot{q}=0.5*q\otimes\omega$ that correlates the values of the attitude angles co as measured by the gyroscope with the derivative of the quaternion $\hat{q}=[q_0,q_1,q_2,q_3]$.

6. The method according to claim 5, wherein it is provided to apply corrective measures to the measurements of the magnetometer.

7. The method according to claim 6, wherein in case the values of the magnetic field measured by the magnetometer are within the safety range, matrixes Q and R of the Kalman filter are varied linearly in order to give more credit to the preliminary estimation from the magnetometer.

8. The method according to claim 6, wherein in case the values of the magnetic field measured by the magnetometer are not within the safety range with respect to the values of Earth's magnetic field, matrixes Q and R of the Kalman filter are varied linearly in order to give more confidence to the estimate from the gyroscope.

9. The method according to claim 6, wherein a heading angle of the control device is calculated by the following formula:

$$\varphi = \tan^{-1}\frac{2(q_0 q_3 + q_1 q_2)}{1 - 2(q_0^2 + q_3^2)}$$

wherein $q_0$, $q_1$, $q_2$ $q_3$ are the components of the quaternion $\hat{q}=[q_0,q_1,q_2,q_3]$ estimated by means of the Kalman filter.

10. The method according to claim 1, wherein a plurality of tolerance zones are defined with respect to the heading angle of the control device at 45°, 135°, 225° and 315° degrees with respect to a reference direction in such a way that, when the heading angle of the control device is located within one of the tolerance zones, a current reassignment configuration of the pushbuttons is maintained.

11. The method according to claim 1, wherein an auditory and/or visual signal occurs in response to a change in a current reassignment configuration of the pushbuttons.

12. The method according to claim 1, further comprising the step of:
    displaying a message that alerts an operator that the at least four directions associated with the pushbuttons correspond to second directions that appear on one or more signs on the operating machine.

* * * * *